United States Patent
Kim et al.

(10) Patent No.: US 10,670,145 B2
(45) Date of Patent: Jun. 2, 2020

(54) ELECTRIC VEHICLE POWERTRAIN AND PARKING CONTROL METHOD THEREOF

(71) Applicants: HYUNDAI MOTOR COMPANY, Seoul (KR); KIA MOTORS CORPORATION, Seoul (KR)

(72) Inventors: Jong Hyun Kim, Yongin-si (KR); Seung Hyun Youn, Hwaseong-si (KR); Yeon Ho Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 90 days.

(21) Appl. No.: 15/829,272

(22) Filed: Dec. 1, 2017

(65) Prior Publication Data

US 2019/0072180 A1 Mar. 7, 2019

(30) Foreign Application Priority Data

Sep. 7, 2017 (KR) .................. 10-2017-0114486

(51) Int. Cl.

| | |
|---|---|
| *F16H 63/48* | (2006.01) |
| *B60K 17/08* | (2006.01) |
| *B60K 17/16* | (2006.01) |
| *B60L 15/00* | (2006.01) |
| *F16D 23/02* | (2006.01) |
| *B60T 1/00* | (2006.01) |
| *B60T 7/12* | (2006.01) |
| *F16H 3/091* | (2006.01) |

(Continued)

(52) U.S. Cl.
CPC ............. *F16H 63/483* (2013.01); *B60K 1/00* (2013.01); *B60K 17/08* (2013.01); *B60K 17/16* (2013.01); *B60L 15/00* (2013.01); *B60L 50/50* (2019.02); *B60T 1/005* (2013.01); *B60T 1/062* (2013.01); *B60T 7/042* (2013.01); *B60T 7/12* (2013.01); *B60T 8/17* (2013.01); *B60T 17/18* (2013.01); *B60T 17/221* (2013.01); *B60W 30/18027* (2013.01); *F16D 23/02* (2013.01); *F16D 28/00* (2013.01); *F16H 3/091* (2013.01); *B60K 2001/001* (2013.01); *F16H 3/089* (2013.01); *F16H 2200/0021* (2013.01); *F16H 2200/0034* (2013.01)

(58) Field of Classification Search
CPC ........ F16H 63/483; B60K 17/08; B60K 17/16
USPC .......................................................... 701/22
See application file for complete search history.

(56) References Cited

U.S. PATENT DOCUMENTS

| | | | | |
|---|---|---|---|---|
| 9,457,688 | B2 * | 10/2016 | Morita | .................. B60L 3/0023 |
| 2004/0113489 | A1 * | 6/2004 | Iwagawa | ................. B60T 7/107 |
| | | | | 303/155 |

(Continued)

*Primary Examiner* — Yazan A Soofi
(74) *Attorney, Agent, or Firm* — Morgan, Lewis & Bockius LLP (57) ABSTRACT

A powertrain for an electric vehicle includes: a motor that generates torque, a motor controller that controls the motor; a two-stage speed reducer connected to the motor and having a synchronizer movable to a neural position when the electric vehicle is parked; a pair of drive wheels connected to the two-stage speed reducer through a differential gear; a pair of electric parking brakes (EPBs) that locks or unlocks the pair of drive wheels, respectively, and a vehicle controller that controls the pair of EPBs. The synchronizer moves to the neutral position to prevent the torque of the motor from being delivered to the drive wheels.

11 Claims, 4 Drawing Sheets

(51) Int. Cl.
  *F16D 28/00*    (2006.01)
  *B60L 50/50*    (2019.01)
  *B60K 1/00*     (2006.01)
  *B60T 17/22*    (2006.01)
  *B60T 17/18*    (2006.01)
  *B60T 7/04*     (2006.01)
  *B60T 1/06*     (2006.01)
  *B60W 30/18*    (2012.01)
  *B60T 8/17*     (2006.01)
  *F16H 3/089*    (2006.01)

(56) References Cited

U.S. PATENT DOCUMENTS

2013/0060412 A1* 3/2013 Nakagawara ............ B60T 1/005
                                             701/22
2013/0275019 A1* 10/2013 Murata .................. B60T 7/12
                                             701/70
2017/0080946 A1* 3/2017 Fontvieille .......... B60L 15/009
2017/0369046 A1* 12/2017 Trappe .................. B60T 7/12
2018/0186352 A1* 7/2018 Goto .................... B60T 8/00

* cited by examiner

ELECTRIC VEHICLE POWERTRAIN AND PARKING CONTROL METHOD THEREOF

CROSS-REFERENCE TO RELATED APPLICATION

This application is based on and claims the benefit of priority to Korean Patent Application No. 10-2017-0114486, filed on Sep. 7, 2017, in the Korean Intellectual Property Office, the disclosure of which is incorporated herein in its entirety by reference.

TECHNICAL FIELD

The present disclosure relates to an electric vehicle. More specifically, the present disclosure relates to an electric vehicle powertrain and a parking control method thereof for reducing manufacturing cost and stably maintaining parking of an electric vehicle through a simple brake structure.

BACKGROUND

In general, electric vehicles (EVs) are zero emission vehicles that travel by driving a motor with electrical energy stored in a battery, transmitting the driving force of the motor to wheels through a power transmission apparatus, and rotating the wheels using the driving force transmitted thereto, as opposed to internal combustion engine vehicles. As serious environmental pollution, together with the depletion of petroleum resources, has become a problem for all mankind, development of low or zero emission vehicles has been required.

As environmental problems have become a serious issue, environmentally-friendly vehicles have recently emerged for energy saving and minimization of environmental pollution. Especially, hydrogen-fueled cell vehicles, bio-diesel vehicles, electric vehicles, and the like have been spotlighted as vehicles capable of replacing existing internal combustion engine vehicles.

An electric vehicle may include a battery for storing and supplying electrical energy, a motor for generating a driving force by transforming the electrical energy of the battery into torque, an inverter for controlling the torque of the motor, a charger for charging the battery with electrical energy, a parking mechanism for parking the electric vehicle, and the like.

Electric vehicles may include a battery electric vehicle (BEV), a plug-in hybrid EV (PHEV), a hybrid EV (HEV), and the like. A hybrid EV (HEV) is a type of hybrid vehicle and electric vehicle that combines an internal combustion engine with an electric motor, and is characterized by high fuel economy and high efficiency, compared to a conventional internal combustion engine vehicle. A plug-in hybrid EV (PHEV) is a vehicle designed such that a battery of an HEV is recharged by plugging it into an external source of electric power, and a battery electric vehicle (BEV) is a vehicle driven by only a battery and an electric motor.

Meanwhile, a parking mechanism of an electric vehicle according to the related art may include a parking pawl selectively engaged with or disengaged from a parking gear of a differential gear, and the parking pawl may be configured to be operated by a shift-by-wire (SBW). However, the parking mechanism in the related art has a disadvantage of high manufacturing cost since the parking mechanism is constituted by the SBW, the parking pawl, the parking gear, and the like.

To overcome the above-mentioned problem, the latest electric vehicle has electric parking brakes (EPBs) installed therein, which are controlled by a vehicle control unit, and the EPBs have brake components for frictionally locking wheels of the vehicle, an electric motor for operating the brake components, and the like. However, in a case where a driver depresses an accelerator pedal during parking, the EPBs may malfunction due to an error in the vehicle control unit to transmit motor torque to the driving wheels, thereby causing sudden unintended acceleration of the vehicle.

SUMMARY

The present disclosure has been made to solve the above-mentioned problems occurring in the related art while advantages achieved by the related art are maintained intact.

An aspect of the present disclosure provides an electric vehicle powertrain and a parking control method thereof that can remarkably reduce manufacturing cost by replacing an SBW, a parking pawl, a parking gear, and the like with electric parking brakes (EPBs) and can stably maintain parking of an electric vehicle by mechanically interrupting delivery of motor torque to drive wheels in a case where the EPBs malfunction due to an error in a vehicle control unit.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a powertrain for an electric vehicle includes a motor that generates torque, a motor controller that controls the motor, a two-stage speed reducer connected to the motor and having a synchronizer movable to a neural position when the electric vehicle is parked, a pair of drive wheels connected to the two-stage speed reducer through a differential gear, a pair of electric parking brakes (EPBs) that locks or unlocks the pair of drive wheels, respectively, and a vehicle controller that controls the pair of EPBs. The synchronizer may move to the neutral position to prevent the torque of the motor from being delivered to the drive wheels.

The two-stage speed reducer may include an input shaft and a counter shaft arranged parallel to each other. A first drive gear and a second drive gear may be mounted on the input shaft so as to be spaced apart from each other. A first driven gear and a second driven gear may be mounted on the counter shaft so as to be spaced apart from each other. The first drive gear may be engaged with the first driven gear, and the second drive gear may be engaged with the second driven gear.

The synchronizer may be mounted on at least one of the input shaft or the counter shaft.

The synchronizer may be disposed between the first driven gear and the second driven gear on the counter shaft.

The synchronizer may move to a first coupling position to couple the first driven gear to the counter shaft, may move to a second coupling position to couple the second driven gear to the counter shaft, or may move to a neutral position such that neither the first driven gear nor the second driven gear is coupled to the counter shaft.

The synchronizer may be disposed between the first drive gear and the second drive gear on the input shaft.

The synchronizer may move to a first coupling position to couple the first drive gear to the input shaft, may move to a second coupling position to couple the second drive gear to the input shaft, or may move to a neutral position such that neither the first drive gear nor the second drive gear is coupled to the input shaft.

The synchronizer may be movable by an electronic actuator.

The electronic actuator may be electrically connected to the vehicle controller, and the vehicle controller may control the electronic actuator.

According to another aspect of the present disclosure, provided is a parking control method of an electric vehicle powertrain that includes a motor that generates torque, a two-stage speed reducer connected to the motor, a synchronizer movable to a first coupling position, a second coupling position, or a neutral position within the two-stage speed reducer, a pair of drive wheels connected to the two-stage speed reducer through a differential gear, a pair of electric parking brakes (EPBs) that locks or unlocks the pair of drive wheels, respectively, and a vehicle controller that controls the pair of EPBs. The method includes determining whether an electric vehicle is in a parked state while a vehicle speed is "0" and a brake-on signal is applied to each EPB by the vehicle controller, moving the synchronizer of the two-stage speed reducer to the neutral position if the electric vehicle is in the parked state, and locking the drive wheels by the respective EPBs.

The EPBs may unlock the respective drive wheels if the electric vehicle is not in the parked state.

According to another aspect of the present disclosure, provided is a parking control method of an electric vehicle powertrain that includes a motor that generates torque, a two-stage speed reducer connected to the motor, a synchronizer movable to a first coupling position, a second coupling position, or a neutral position within the two-stage speed reducer, a pair of drive wheels connected to the two-stage speed reducer through a differential gear, a pair of electric parking brakes (EPBs) that locks or unlocks the pair of drive wheels, respectively, and a vehicle controller that controls the pair of EPBs. The method includes determining whether an electric vehicle is shifted from a parked state to a driving state while a vehicle speed is "0" and a brake-on signal is applied to each EPB by the vehicle controller, moving the synchronizer of the two-stage speed reducer to the first coupling position or the second coupling position if the electric vehicle is shifted from the parked state to the driving state, maintaining the drive wheels in a locked state by a lock operation of the respective EPBs, and unlocking the drive wheels by the respective EPBs if an acceleration signal and a brake-off signal are applied to each EPB by the vehicle controller.

The vehicle controller may control the EPBs to lock the respective drive wheels in a case where the electric vehicle enters a hill.

According to the present disclosure, a synchronizer of a two-stage speed reducer is configured to move to a neutral position while an electric vehicle is in a parked state. Therefore, it is possible to mechanically interrupt delivery of motor torque to vehicle wheels, thereby preventing sudden unintended acceleration of the vehicle caused by accelerator-pedal depression, an error in a vehicle controller, or the like in the parked state and thus ensuring stability.

In addition, by connecting electric parking brakes (EPBs) locking vehicle wheels for parking, it is possible to exclude a parking mechanism constituted by an SBW, a parking pawl, a parking gear, and the like, thereby remarkably reducing manufacturing cost.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

Terms, such as "first", "second", "A", "B", "(a)", "(b)", and the like, may be used herein to describe elements of the present disclosure. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present disclosure pertains. Such terms ms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
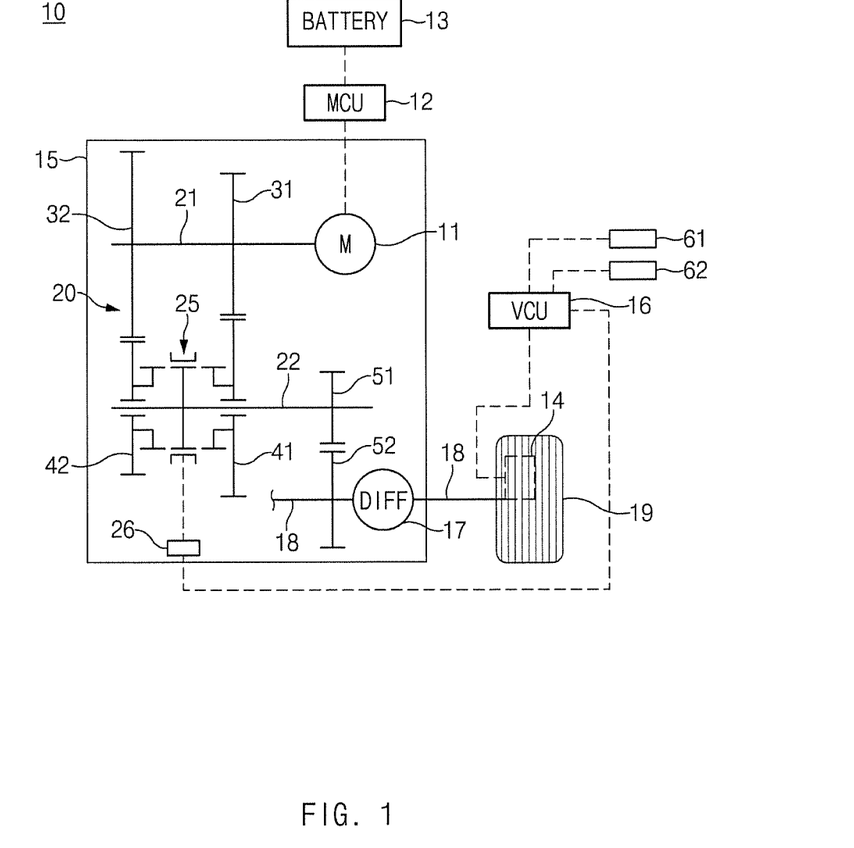
FIG. 1 is a block diagram of an electric vehicle powertrain according to an embodiment of the present disclosure.
Figure 2:
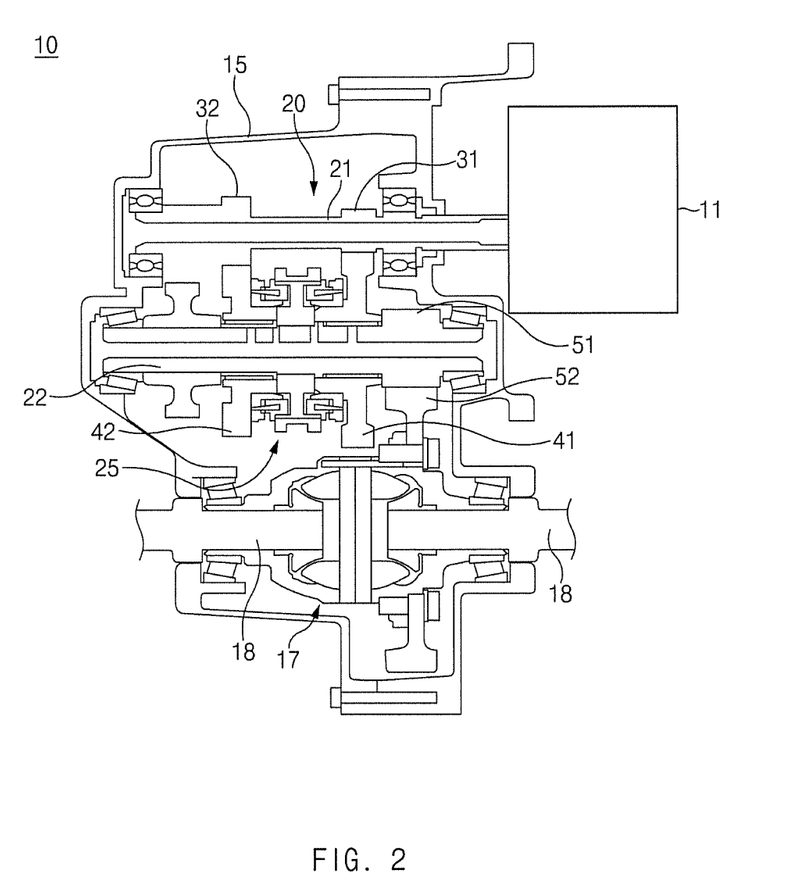
FIG. 2 is a sectional view of the electric vehicle powertrain according to an embodiment of the present disclosure.

Referring to FIGS. 1 and 2, an electric vehicle powertrain 10 according to an embodiment of the present disclosure may include a motor 11 that generates torque, a motor control unit 12 that controls the motor 11, a two-stage speed reducer 20 connected to the motor 11, a differential gear 17 connected to the two-stage speed reducer 20, a pair of drive wheels 19 connected to the differential gear 17, a pair of electric parking brakes (EPBs) 14 that locks or unlocks the pair of drive wheels 19, respectively, and a vehicle control unit 16 that controls the pair of EPBs 19.

The motor 11 may be configured to generate torque for driving the drive wheels 10, and a battery 13 may be connected to the motor 11.

The motor control unit 12 may be electrically connected to the motor 11 and may be configured to control the torque and rotational speed of the motor 11.

The two-stage speed reducer 20 may include an input shaft 21 and a counter shaft 22 arranged parallel to each other.

A first drive gear 31 and a second drive gear 32 may be mounted on the input shaft 21. The first drive gear 31 and the second drive gear 32 and may be spaced apart from each other.

A first driven gear 41 and a second driven gear 42 may be mounted on the counter shaft 22. The first driven gear 41 and the second driven gear 42 may be spaced apart from each other.

The first drive gear 31 may be engaged with the first driven gear 41, and the second drive gear 32 may be engaged with the second driven gear 42.

A synchronizer 25 may be mounted on at least one of the input shaft 21 and the counter shaft 22.

According to an embodiment, as illustrated in FIGS. and 2, the synchronizer 25 may be disposed between the first driven gear 41 and the second driven gear 42 on the counter shaft 22. The first driven gear 41 and the second driven gear 42 may be mounted to freely rotate relative to the counter shaft 22, and the first drive gear 31 and the second drive gear may be fixedly mounted on the input shaft 21. The synchronizer 25 may be configured to selectively couple any one of the first driven gear 41 and the second driven gear 42 to the counter shaft 22 or may be configured such that neither the first driven gear 41 nor the second driven gear 42 is coupled to the counter shaft 22. Specifically, the synchronizer 25 may be configured to move to a first coupling position to couple the first driven gear 41 to the counter shaft 22, a second coupling position to couple the second driven gear 42 to the counter shaft 22, or a neural position such that neither the first driven gear 41 nor the second driven gear 42 is coupled to the counter shaft 22. If the synchronizer 25 moves to the first coupling position, the synchronizer 25 couples the first driven gear 41 to the counter shaft 22, and if the synchronizer 25 moves to the second coupling position, the synchronizer 25 couples the second driven gear 42 to the counter shaft 22. If the synchronizer 25 moves to the neutral position, neither the first driven gear 41 nor the second driven gear 42 is coupled to the counter shaft 22.

According to another embodiment, the synchronizer 25 may be disposed between the first drive gear 31 and the second drive gear 32 on the input shaft 21. The first drive gear 31 and the second drive gear 32 may be mounted to freely rotate relative to the input shaft 21, and the first driven gear 41 and the second driven gear 42 may be fixedly mounted on the counter shaft 22. The synchronizer 25 may be configured to selectively couple any one of the first drive gear 31 and the second drive gear 32 to the input shaft 21 or may be configured such that neither the first drive gear 31 nor the second drive gear 32 is coupled to the input shaft 21. Specifically, the synchronizer 25 may be configured to move to a first coupling position to couple the first drive gear 31 to the input shaft 21, a second coupling position to couple the second drive gear to the input shaft 21, or a neural position such that neither the first drive gear 31 nor the second drive gear 32 is coupled to the input shaft 21. If the synchronizer 25 moves to the first coupling position, the synchronizer 25 couples the first drive gear 31 to the input shaft 21, and if the synchronizer 25 moves to the second coupling position, the synchronizer 25 couples the second drive gear 32 to the input shaft 21. If the synchronizer 25 moves to the neutral position, neither the first drive gear 31 nor the second drive gear 32 is coupled to the input shaft 21.

The synchronizer 25 may be configured to be movable by an electronic actuator 26, such as an electric motor, a solenoid actuator, or the like. The electronic actuator 26 may be electrically connected to the vehicle control unit 16, and therefore the vehicle control unit 16 may operate the electronic actuator 26.

The differential gear 17 may be connected to the counter shaft 22 of the two-stage speed reducer 20 through a set of final gears 51 and 52.

The pair of drive wheels 19 may be connected to the differential gear 17 through a pair of drive shafts 18.

Meanwhile, the two-stage speed reducer 20 and the differential gear 17 may be disposed inside a housing 15, and the motor 11 may be removably coupled to the two-stage speed reducer 20 through the housing 15 or may be integrated with the two-stage speed reducer 20.

Each electric parking brake (EPB) 14 may be configured to selectively lock or unlock the corresponding drive wheel 19 during parking or braking of an electric vehicle. Specifically, each EPB 14 may include brake components that frictionally lock a wheel of a vehicle, an electric motor that drives the brake components, and the like.

The vehicle control unit 16 may be configured to control each EPB 14 through an acceleration signal, a brake-on signal, a brake-off signal, and the like.

An accelerator pedal position sensor 61 that detects the position of an accelerator pedal and a brake pedal position sensor 62 that detects the position of a brake pedal may be electrically connected to the vehicle control unit 16. Accordingly, the vehicle control unit 16 may generate an acceleration signal by using the accelerator pedal position sensor 61 and may generate a brake-on signal or a brake-off signal by using the brake pedal position sensor 62.

According to the electric vehicle powertrain 10 of the present disclosure, the synchronizer 25 of the two-stage speed reducer 20 may move to the neutral position and each EPB 14 may lock the corresponding drive wheel 19 if the speed of the electric vehicle is "0", a brake-on signal is applied to each EPB 14 by the vehicle control unit 16, and the electric vehicle is in a parked state (that is, a state in which a gear shifter has been shifted to a parking mode). Since the synchronizer 25 of the two-stage speed reducer 20 is in the neutral position, even though a driver depresses the accelerator pedal or there is an error in the vehicle control unit 16, torque of the motor 11 may be prevented from being delivered to the pair of drive wheels 19. As a result, the electric vehicle may stably remain in the parked state.

Figure 3:
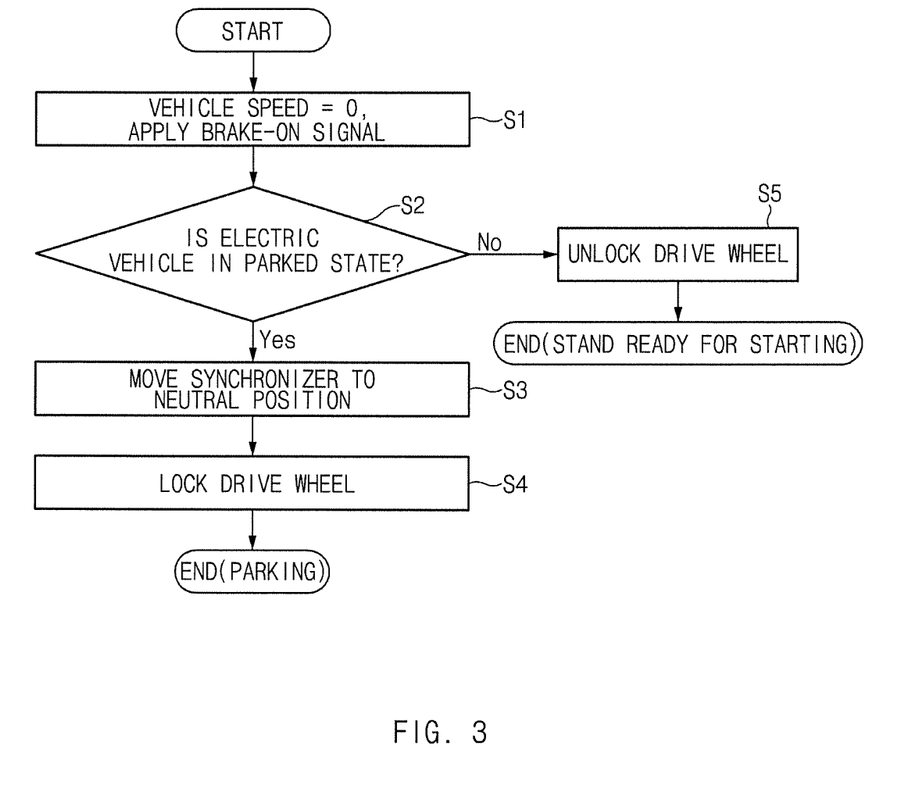
FIG. 3 is a flowchart illustrating a method of controlling parking of the electric vehicle powertrain, according to an embodiment of the present disclosure.

FIG. 3 is a flowchart illustrating a method of controlling parking of the electric vehicle powertrain, according to an embodiment of the present disclosure.

In the state in which the speed of an electric vehicle is "0" and a brake-on signal is applied to each EPB 14 by the vehicle control unit 16 when a driver depresses a brake pedal (Step S1), it is determined whether the electric vehicle is in a parked state (Step S2). That is, it is determined whether a gear shifter is shifted to a parking mode (Step S2).

If the electric vehicle is in the parked state, the synchronizer 25 of the two-stage speed reducer 20 may be moved to a neutral position (Step S3). Since the vehicle speed is "0", the brake-on signal rather than an acceleration signal may be applied to each EPB 14, and therefore the EPB 14 may lock the corresponding drive wheel 19 (Step S4).

Since the synchronizer 25 of the two-stage speed reducer 20 is in the neutral position, even though the driver depresses an accelerator pedal or there is an error in the vehicle control unit 16, torque of the motor 11 may be prevented from being delivered to the pair of drive wheels 19. As a result, the electric vehicle may stably remain in the parked state.

If the electric vehicle is not in the parked state (that is, if the gear shifter is shifted to a driving mode), each EPB 14 may unlock the corresponding drive wheel 19, and thus the electric vehicle may stand ready for starting (Step S5). In this case, the synchronizer 25 may be moved to a first coupling position to couple the first driven gear 41 or the first drive gear 31 or may be moved to a second coupling position to couple the second driven gear 42 or the second drive gear 32. Accordingly, the electric vehicle may remain in first or second gear.

Figure 4:
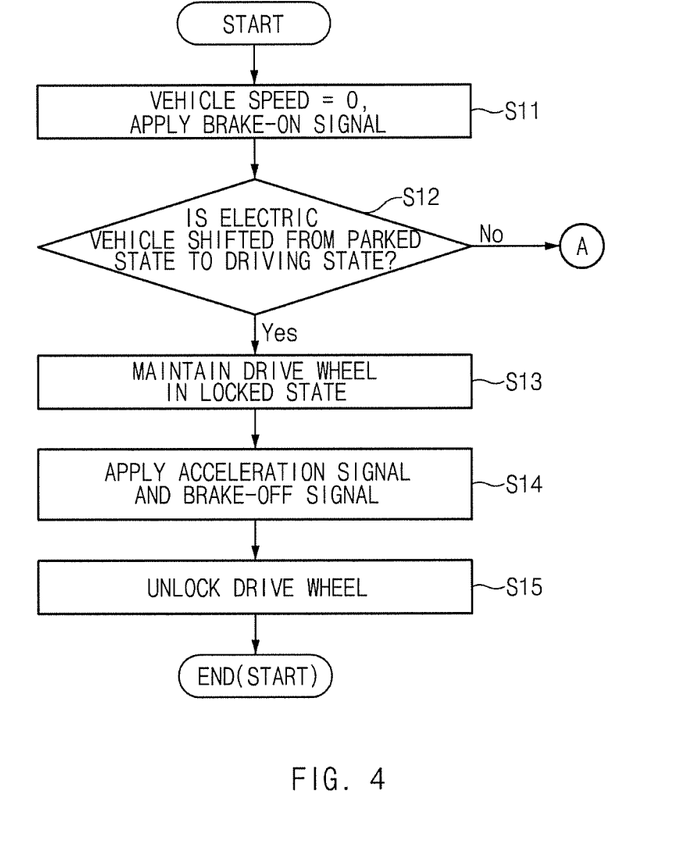
FIG. 4 is a flowchart illustrating a method of controlling unparking of the electric vehicle powertrain, according to an embodiment of the present disclosure.

FIG. 4 is a flowchart illustrating a method of controlling unparking of the electric vehicle powertrain, according to an embodiment of the present disclosure.

In the state in which the speed of an electric vehicle is "0" and a brake-on signal is applied to each EPB 14 by the vehicle control unit 16 when a driver depresses a brake pedal (Step S11), it is determined whether the electric vehicle is shifted from a parked state to a driving state (Step S12). That is, it is determined whether a gear shifter is shifted from a parking mode to a driving mode.

If the determination result in step S12 shows that the electric vehicle is shifted from the parked state to the driving state, the synchronizer 25 of the two-stage speed reducer 20 may be moved to a first or second coupling position, and each drive wheel 19 may be maintained in a locked state by a lock operation of the corresponding EPB 14 (Step S13). As described above, the first coupling position may be a position for coupling the first driven gear 41 to the counter shaft 22 or the first drive gear 31 to the input shaft 21, and the second coupling position may be a position for coupling the second driven gear 42 to the counter shaft 22 or the second drive gear 32 to the input shaft 21.

Thereafter, if the driver releases the brake pedal and depresses an accelerator pedal, an acceleration signal and a brake-off signal may be applied to each EPB 14 (Step S14), and the EPB 14 may unlock the corresponding drive wheel 19 (Step S15). Accordingly, torque of the motor 11 may be delivered to each drive wheel 19, and thus the electric vehicle may start.

When the electric vehicle enters a hill, the vehicle control unit 16 may sense the entrance of the electric vehicle into the hill and may execute a hill assist mode, in which each EPB 14 locks the corresponding drive wheel 19, to prevent the electric vehicle from being pushed rearward on the hill.

In addition, if the determination result in step S12 shows that the electric vehicle is not shifted to the driving state, the process illustrated in FIG. 3 may be performed.

Although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure.

Therefore, exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A powertrain for an electric vehicle, the powertrain comprising:
 a motor configured to generate torque;
 a motor controller configured to control the motor;
 a two-stage speed reducer connected to the motor and having a synchronizer movable to a neutral position when the electric vehicle is parked, the synchronizer configured to be movable by an electronic actuator;
 a pair of drive wheels connected to the two-stage speed reducer through a differential gear;
 a pair of electric parking brakes (EPBs) configured to lock or unlock the pair of drive wheels, respectively; and
 a vehicle controller configured to control the pair of EPBs and the electronic actuator,
 wherein the vehicle controller controls the synchronizer to move to the neutral position to prevent the torque of the motor from being delivered to the pair of drive wheels and to lock the pair of drive wheels by the pair of EPBs.

2. The powertrain of claim 1, wherein the two-stage speed reducer includes an input shaft and a counter shaft arranged parallel to each other,
 wherein a first drive gear and a second drive gear are mounted on the input shaft and spaced apart from each other,
 wherein a first driven gear and a second driven gear are mounted on the counter shaft so as to be spaced apart from each other,
 wherein the first drive gear is engaged with the first driven gear, and the second drive gear is engaged with the second driven gear, and
 wherein the synchronizer is mounted on at least one of the input shaft or the counter shaft.

3. The powertrain of claim 2, wherein the synchronizer is disposed between the first driven gear and the second driven gear on the counter shaft.

4. The powertrain of claim 3, wherein the synchronizer is configured to move to a first coupling position to couple the first driven gear to the counter shaft, a second coupling position to couple the second driven gear to the counter shaft, or a neutral position such that the first driven gear and the second driven gear are decoupled from the counter shaft.

5. The powertrain of claim 2, wherein the synchronizer is disposed between the first drive gear and the second drive gear on the input shaft.

6. The powertrain of claim 5, wherein the synchronizer is configured to move to a first coupling position to couple the first drive gear to the input shaft, a second coupling position to couple the second drive gear to the input shaft, or a neutral position such that the first drive gear and the second drive gear are decoupled from the input shaft.

7. The powertrain of claim 1, wherein the electronic actuator is electrically connected to the vehicle controller.

8. A parking control method of an electric vehicle powertrain that includes a motor configured to generate torque, a two-stage speed reducer connected to the motor, a synchronizer movable to a first coupling position, a second coupling position, or a neutral position within the two-stage speed reducer, a pair of drive wheels connected to the two-stage speed reducer through a differential gear, a pair of electric parking brakes (EPBs) configured to lock or unlock the pair of drive wheels, respectively, and a vehicle controller configured to control the pair of EPBs, the method comprising:
 determining whether the electric vehicle is in a parked state while a vehicle speed is "0" and a brake-on signal is applied to each EPB by the vehicle controller;
 moving the synchronizer of the two-stage speed reducer to the neutral position if the electric vehicle is in the parked state; and
 locking the pair of drive wheels by the respective EPB,
 wherein the synchronizer is configured to be movable by an electronic actuator, and
 wherein the vehicle controller is further configured to control the electronic actuator.

9. The method of claim 8, wherein the EPBs unlock the respective drive wheels if the electric vehicle is not in the parked state.

10. A parking control method of an electric vehicle powertrain that includes a motor configured to generate torque, a two-stage speed reducer connected to the motor, a synchronizer movable to a first coupling position, a second coupling position, or a neutral position within the two-stage speed reducer, a pair of drive wheels connected to the two-stage speed reducer through a differential gear, a pair of electric parking brakes (EPBs) configured to lock or unlock the pair of drive wheels, respectively, and a vehicle controller configured to control the pair of EPBs, the method comprising:

determining whether the electric vehicle is shifted from a parked state to a driving state while a vehicle speed is "0" and a brake-on signal is applied to each EPB by the vehicle controller;

moving the synchronizer of the two-stage speed reducer to the first coupling position or the second coupling position if the electric vehicle is shifted from the parked state to the driving state;

maintaining the pair of drive wheels in a locked state by a lock operation of the respective EPBs; and     unlocking the pair of drive wheels by the respective EPBs if an acceleration signal and a brake-off signal are applied to each EPB by the vehicle controller,     wherein the synchronizer is configured to be movable by an electronic actuator, and     wherein the vehicle controller is further configured to control the electronic actuator.

11. The method of claim 10, wherein the vehicle controller controls the EPBs to lock the respective drive wheels in a case where the electric vehicle enters a hill.

\* \* \* \* \*